US009443663B2

(12) United States Patent
Yokoshima

(10) Patent No.: US 9,443,663 B2
(45) Date of Patent: Sep. 13, 2016

(54) ELECTRIC DOUBLE-LAYER CAPACITOR

(75) Inventor: Katsunori Yokoshima, Kyoto (JP)

(73) Assignee: NICHICON CORPORATION, Kyoto-Shi (JP)

(*) Notice: Subject to any disclaimer, the term of this patent is extended or adjusted under 35 U.S.C. 154(b) by 262 days.

(21) Appl. No.: 14/007,358

(22) PCT Filed: Jul. 20, 2012

(86) PCT No.: PCT/JP2012/068412
§ 371 (c)(1),
(2), (4) Date: Sep. 25, 2013

(87) PCT Pub. No.: WO2013/012056
PCT Pub. Date: Jan. 24, 2013

(65) Prior Publication Data
US 2014/0139972 A1 May 22, 2014

(30) Foreign Application Priority Data

Jul. 20, 2011 (JP) .................................. 2011-158786

(51) Int. Cl.
*H01G 11/24* (2013.01)
*H01G 9/10* (2006.01)
(Continued)

(52) U.S. Cl.
CPC ............. *H01G 11/24* (2013.01); *H01G 11/66* (2013.01); *H01G 11/74* (2013.01); *H01G 11/82* (2013.01); *H01G 11/70* (2013.01); *Y02E 60/13* (2013.01)

(58) Field of Classification Search
CPC ........ H01G 9/10; H01G 11/24; H01G 9/155; H01G 9/008; H01G 11/82; H01G 9/048
USPC .......................... 361/511, 515, 520, 530, 502
See application file for complete search history.

(56) References Cited

U.S. PATENT DOCUMENTS

| 2001/0023038 A1 | 9/2001 | Ligeois |
| 2011/0157778 A1* | 6/2011 | Fujimoto ............... H01G 9/008 361/531 |
| 2012/0040231 A1 | 2/2012 | Hagiwara |

FOREIGN PATENT DOCUMENTS

| CN | 201741582 | 2/2011 |
| DE | 102006035100 | 1/2008 |

(Continued)

OTHER PUBLICATIONS

International Search Report of International application No. PCT/JP2012/068412 (Oct. 30, 2012).

(Continued)

*Primary Examiner* — Eric Thomas
*Assistant Examiner* — Arun Ramaswamy
(74) *Attorney, Agent, or Firm* — Lex IP Meister, PLLC

(57) ABSTRACT

The present application provides an electric double-layer capacitor capable of reducing an internal resistance without exerting a large stress on a positive electrode body, a negative electrode body, and separators. The electric double-layer capacitor according to the present invention is obtained by housing a capacitor element impregnated with an electrolytic solution in a case. The capacitor element is obtained by stacking and winding a positive electrode body, separators, and a negative electrode body. The positive electrode body has positive electrode current collector tabs fixed on positive electrode current collectors. The negative electrode body has negative electrode current collector tabs fixed on negative electrode current collectors. The paired positive electrode current collector tab are displaced from each other and the paired negative electrode tabs are displaced from each other in a state where the positive electrode body and the negative electrode body are not wound.

7 Claims, 13 Drawing Sheets

(51) Int. Cl.
*H01G 9/00* (2006.01)
*H01G 9/008* (2006.01)
*H01G 9/048* (2006.01)
*H01G 11/82* (2013.01)
*H01G 4/32* (2006.01)
*H01G 4/228* (2006.01)
*H05K 5/03* (2006.01)
*H01G 9/04* (2006.01)
*H01G 11/74* (2013.01)
*H01G 11/66* (2013.01)
*H01G 11/70* (2013.01)

(56) References Cited

FOREIGN PATENT DOCUMENTS

| | | |
|---|---|---|
| EP | 1134820 | 9/2001 |
| JP | 2001-52969 | 2/2001 |
| JP | 2001237150 | 8/2001 |
| JP | 2002231587 | 8/2002 |
| JP | 2005-93859 | 4/2005 |
| JP | 2005093859 | 4/2005 |
| JP | 2008-91585 | 4/2008 |
| JP | 2008091585 | 4/2008 |
| JP | 2010080857 | 4/2010 |
| WO | 2010125867 | 11/2010 |

OTHER PUBLICATIONS

The Extended European Search Report dated Jun. 22, 2015, European Patent Office, European Patent Application No. 12814536.4.

The Office Action Jun. 3, 2015, State Intellectual Property Office of the P.R.C, Chinese Patent Application No. 201280008315.X.

* cited by examiner (a)

(b)

ELECTRIC DOUBLE-LAYER CAPACITOR

TECHNICAL FIELD

The present invention relates to an electric double-layer capacitor used in a variety of electronic devices.

BACKGROUND ART

An electric double-layer capacitor is an electric storage device applying to storage of electricity a phenomenon in which layers (an electric double-layer), each having positively or negatively charged ions arrayed therein at extremely short distances, are formed in interfaces, in each of which two different phases contact each other as with a solid-state electrode and an electrolytic solution. This electric double-layer capacitor has an extremely large capacitance from several tens of milli-farads to several thousands of farads or more and has characteristics which are an excellent charge and discharge cycle (life) and an excellent rapid charge and discharge. Therefore, the electric double-layer capacitor is used as a back-up power source which is a power supply source for retaining operations of a real-time clock and a memory IC while a power source of an apparatus is turned off or as a power source for power assist and power supply, used upon activating and operating an actuator motor or the like of an apparatus.

As shown in FIG. 9 and FIG. 10, an electric double-layer capacitor Y has a configuration in which a capacitor element 8 impregnated with an electrolytic solution is housed in a case 90 and an upper opening 91 of the case 90 is sealed with an insulating member 92.

As is seen from FIG. 11 and FIG. 12(a), the capacitor element 8 has a configuration in which a positive electrode body 80, a separator 81, a negative electrode body 82, and a separator 83 are stacked in this order and are wound in a cylindrically-shaped manner. The positive electrode body 80 has a configuration in which two positive electrode current collectors 84A and 85A having polarized electrode layers 86A and 87A formed respectively thereon are caused to contact each other such that surfaces of the positive electrode current collectors 84A and 85A, on which the polarized electrode layers 86A and 87A are not formed, contact each other. The negative electrode body 82 has a configuration in which two negative electrode current collectors 84B and 85B having polarized electrode layers 86B and 87B formed respectively thereon are caused to contact each other, as with the positive electrode body 80.

As shown in FIG. 10 and FIG. 12(b), the positive electrode body 80 further has an external terminal 93A fixed in the insulating member 92 and positive electrode tabs 88A and 89A for allowing conduction with the positive electrode current collectors 84A and 85A. The positive electrode tabs 88A and 89A are attached onto surfaces of the positive electrode current collectors 84A and 85A, on which the polarized electrode layers 86A and 87A are not formed.

As shown in FIG. 10 and FIG. 12(c), the negative electrode body 82 further has an external terminal 93B fixed in the insulating member 92 and negative electrode tabs 88B and 89B for allowing conduction with the negative electrode current collectors 84B and 85B, as with the positive electrode body 80. The negative electrode tabs 88B and 89B are attached onto surfaces of the negative electrode current collectors 84B and 85B, on which the polarized electrode layers 86B and 87B are not formed.

As shown in FIG. 12(b), FIG. 12(c), and FIG. 13, the positive electrode tabs 88A and 89A or the negative electrode tabs 88B and 89B are in contact with and paired with each other in a corresponding relationship without being displaced (for example, refer to Patent Literature 1).

In the capacitor element 8, since the larger the number of the tabs 88A, 88B, 89A, and 89B is, the larger an increase in current collecting points is, thereby reducing an internal resistance, a larger number of the tabs 88A, 88B, 89A, and 89B is preferable. Therefore, as shown in FIG. 9, FIG. 10, FIG. 12(b), and FIG. 12(c), there also available is a capacitor element 8 which includes a plurality of tabs 88A, 88B, 89A, and 89B in a positive electrode body 80 and a negative electrode body 82, respectively (for example, refer to Patent Literature 2). On the other hand, in the configuration in which the tabs 88A and 88B, 89A, and 89B are in contact with each other, respectively without being displaced, when the number of the tabs 88A, 88B, 89A, and 89B is large, as is understood from FIG. 13, due to the influences of thicknesses of the tabs 88A, 88B, 89A, and 89B, the capacitor element 8 becomes out of roundness, and therefore, there is a limit to the number of the tabs 88A, 88B, 89A, and 89B. For example, in a capacitor element 8 in which metal foil as current collectors each having a thickness of approximately 20 to 50 μm and tabs each having a thickness of approximately 100 to 200 μm are used, the number of pairs of the tabs 88A, 88B, 89A, and 89B is approximately two in one side of the electrodes in a small-sized device (φ35) (the total number of tabs is four on the one side of the electrodes) or approximately four on one side of the electrodes in a device having φ51 or more (the total number of tabs is eight on the one side of the electrodes).

In addition, in the configuration in which the tabs 88A and 88B, 89A, and 89B are in contact with each other, respectively without being displaced, thicknesses of respective two pieces among the tabs 88A, 88B, 89A, and 89B are concentrated in one portion, thereby leading to a problem in that a large stress is exerted also on the positive electrode body 80, the negative electrode body 82, and the separators 81 and 83.

CITATION LIST

Patent Literature

Patent Literature 1: Japanese Patent Application Laid-Open Publication No. 2005-093859

Patent Literature 2: Japanese Patent Application Laid-Open Publication No. 2008-091585

SUMMARY OF THE INVENTION

Technical Problem

An object of the present invention is to provide an electric double-layer capacitor capable of reducing an internal resistance without exerting a large stress on a positive electrode body, a negative electrode body, and separators.

Solution to Problem

An electric double-layer capacitor according to a first embodiment of the present invention includes: a capacitor element impregnated with an electrolytic solution; a case for housing the capacitor element; and an external positive electrode terminal and an external negative electrode terminal, the external positive electrode terminal and external negative electrode terminal being brought into conduction with the capacitor element. The capacitor element is obtained by stacking and winding a positive electrode body, a separator, and a negative electrode body. The positive electrode body includes a first positive electrode current collector, a second positive electrode current collector having one surface side being in contact with one surface of the first positive electrode current collector, and a plurality of positive electrode current collector tab pairs being brought into conduction with the external positive electrode terminal. Each of the positive electrode current collector tab pairs has a first positive electrode current collector tab being fixed onto the one surface of the first positive electrode current collector and a second positive electrode current collector tab being fixed onto the one surface of the second positive electrode current collector and being displaced from the first positive electrode current collector tab in a state where the positive electrode body is not wound. The negative electrode body includes a first negative electrode current collector, a second negative electrode current collector having one surface side being in contact with one surface of the first negative electrode current collector, and a plurality of negative electrode current collector tab pairs being brought into conduction with the external negative electrode terminal. Each of the negative electrode current collector tab pairs has a first negative electrode current collector tab being fixed onto the one surface of the first negative electrode current collector and a second negative electrode current collector tab being fixed onto the one surface of the second negative electrode current collector and being displaced from the first negative electrode current collector tab in a state where the negative electrode body is not wound.

In the first embodiment of the present invention, in the state where the positive electrode body and the negative electrode body are not wound, the first positive electrode current collector tabs and the second positive electrode current collector tabs are displaced from each other and the first negative electrode current collector tabs and the second negative electrode current collector tabs are displaced from each other. Therefore, in the state where the positive electrode body and the negative electrode body are wound, current collecting points between the paired first positive electrode current collector tab and second positive electrode current collector tab can be dispersed without concentrating in one portion, and current collecting points between the paired first negative electrode current collector tab and second negative electrode current collector tab can also be dispersed without concentrating in one portion. Accordingly, in the first embodiment of the present invention, by dispersing the current collecting points, an internal resistance by the current collectors upon charging and discharging can be reduced. In addition, in the state where the positive electrode body and the negative electrode body are not wound, the paired positive electrode current collector tabs are displaced from each other and the paired negative electrode current collector tabs are displaced from each other. Therefore, in the state where the positive electrode body and the negative electrode body are wound, it does not occur that portions of the current collector tabs, fixed on the positive electrode body and the negative electrode body, lie on top of each other respectively so as to contact each other. Accordingly, in the first embodiment of the present invention, since in each of the portions of the current collector tabs, fixed on the positive electrode body and the negative electrode body, a stress exerted on one portion is made a stress resulting from a thickness of one tab. Therefore, as compared with a case where the paired first positive electrode current collector tab and second positive electrode current collector tab lie on top of each other in the same one portion or the paired first negative electrode current collector tab and second negative electrode current collector tab lie on top of each other in the same one portion as in the conventional manner, a stress exerted on the positive electrode body, the negative electrode body, and the separators can be alleviated.

An electric double-layer capacitor according to a second embodiment of the present invention includes: a capacitor element impregnated with an electrolytic solution; a case for housing the capacitor element; and an external positive electrode terminal and an external negative electrode terminal, the external positive electrode terminal and external negative electrode terminal being brought into conduction with the capacitor element. The capacitor element is obtained by stacking and winding a positive electrode body, a separator, and a negative electrode body. The positive electrode body includes a first positive electrode current collector, a second positive electrode current collector having one surface side being in contact with one surface of the first positive electrode current collector, and a plurality of positive electrode current collector tab pairs being brought into conduction with the external positive electrode terminal. Each of the positive electrode current collector tab pairs has a first positive electrode current collector tab being fixed onto the one surface of the first positive electrode current collector and a second positive electrode current collector tab being fixed onto the one surface of the second positive electrode current collector. The first positive electrode current collector tab and the second positive electrode current collector tab are spaced apart from each other with the second positive electrode current collector, the separator, the first negative electrode current collector, the second negative electrode current collector, and the first positive electrode current collector being interposed. The negative electrode body includes a first negative electrode current collector, a second negative electrode current collector having one surface side being in contact with one surface of the first negative electrode current collector, and a plurality of negative electrode current collector tab pairs being brought into conduction with the external negative electrode terminal. Each of the negative electrode current collector tab pairs has a first negative electrode current collector tab being fixed onto the one surface of the first negative electrode current collector and a second negative electrode current collector tab being fixed onto the one surface of the second negative electrode current collector. The first negative electrode current collector tab and the second negative electrode current collector tab are spaced apart from each other with the second negative electrode current collector, the separator, the first positive electrode current collector, the second positive electrode current collector, and the first negative electrode current collector being interposed.

In the second embodiment of the present invention, the paired positive electrode current collector tabs and the paired negative electrode current collector tabs are not in contact with each other and are spaced apart from each other, respectively. Therefore, positive electrode current collecting points between the respective positive electrode current collector tabs and the positive electrode current collectors can be dispersed, and current collecting points between the respective negative electrode current collector tabs and the negative electrode current collectors can be dispersed. Accordingly, in the second embodiment of the present invention, as with the first embodiment of the present invention, an internal resistance by the current collectors upon charging and discharging can be reduced. In addition, in the second embodiment of the present invention, since the paired negative electrode current collector tabs are not in contact with each other and are spaced apart from each other, a stress exerted on one portion is made a stress resulting from a thickness of one tab. As a result, as compared with a case where the paired current collector tabs lie on top of each other in the same one portion in the conventional manner, a stress exerted on the positive electrode body, the negative electrode body, and the separators can be alleviated.

In a preferable embodiment of the present invention, the plurality of positive electrode current collector tab pairs include a first positive electrode current collector tab pair and a second positive electrode current collector tab pair, and in a state where the positive electrode body is not wound, between a first positive electrode current collector tab of the first positive electrode current collector tab pair and a first positive electrode current collector tab of the second positive electrode current collector tab pair, a second positive electrode current collector tab of the first positive electrode current collector tab pair or the second positive electrode current collector tab pair is located, and the plurality of negative electrode current collector tab pairs include a first negative electrode current collector tab pair and a second negative electrode current collector tab pair, and in a state where the negative electrode body is not wound, between a first negative electrode current collector tab of the first negative electrode current collector tab pair and a first negative electrode current collector tab of the second negative electrode current collector tab pair, a second negative electrode current collector tab of the first negative electrode current collector tab pair or the second negative electrode current collector tab pair is located.

In the above-described configuration, all the current collector tabs are located so as to be appropriately spaced, distances among the neighboring current collector tabs in the current collectors in a circumferential direction can be made appropriate. Therefore, it is made possible to make the internal resistance by the current collectors among the neighboring current collector tabs appropriately small.

In a preferable embodiment of the present invention, the first positive electrode current collector tab is fixed on the first positive electrode current collector while being in contact with the second positive electrode current collector, the second positive electrode current collector tab is fixed on the second positive electrode current collector while being in contact with the first positive electrode current collector, the first negative electrode current collector tab is fixed on the first negative electrode current collector while being in contact with the second negative electrode current collector, and the second negative electrode current collector tab is fixed on the second negative electrode current collector while being in contact with the first negative electrode current collector.

In the above-described configuration, the respective positive electrode current collector tabs are brought into conduction with both of the first and second positive electrode current collectors, and the respective negative electrode current collector tabs are brought into conduction with both of the first and second negative electrode current collector. Therefore, since the respective current collector tabs are capable of ensuring current conducting paths for the two current collectors, an internal resistance can be reduced.

Advantageous Effects of the Invention

According to the present invention, in an electric double-layer capacitor, an internal resistance can be reduced without exerting a large stress on a positive electrode body, a negative electrode body, and separators.

DESCRIPTION OF EMBODIMENTS

Hereinafter, an embodiment of the present invention will be described.

Figure 1:
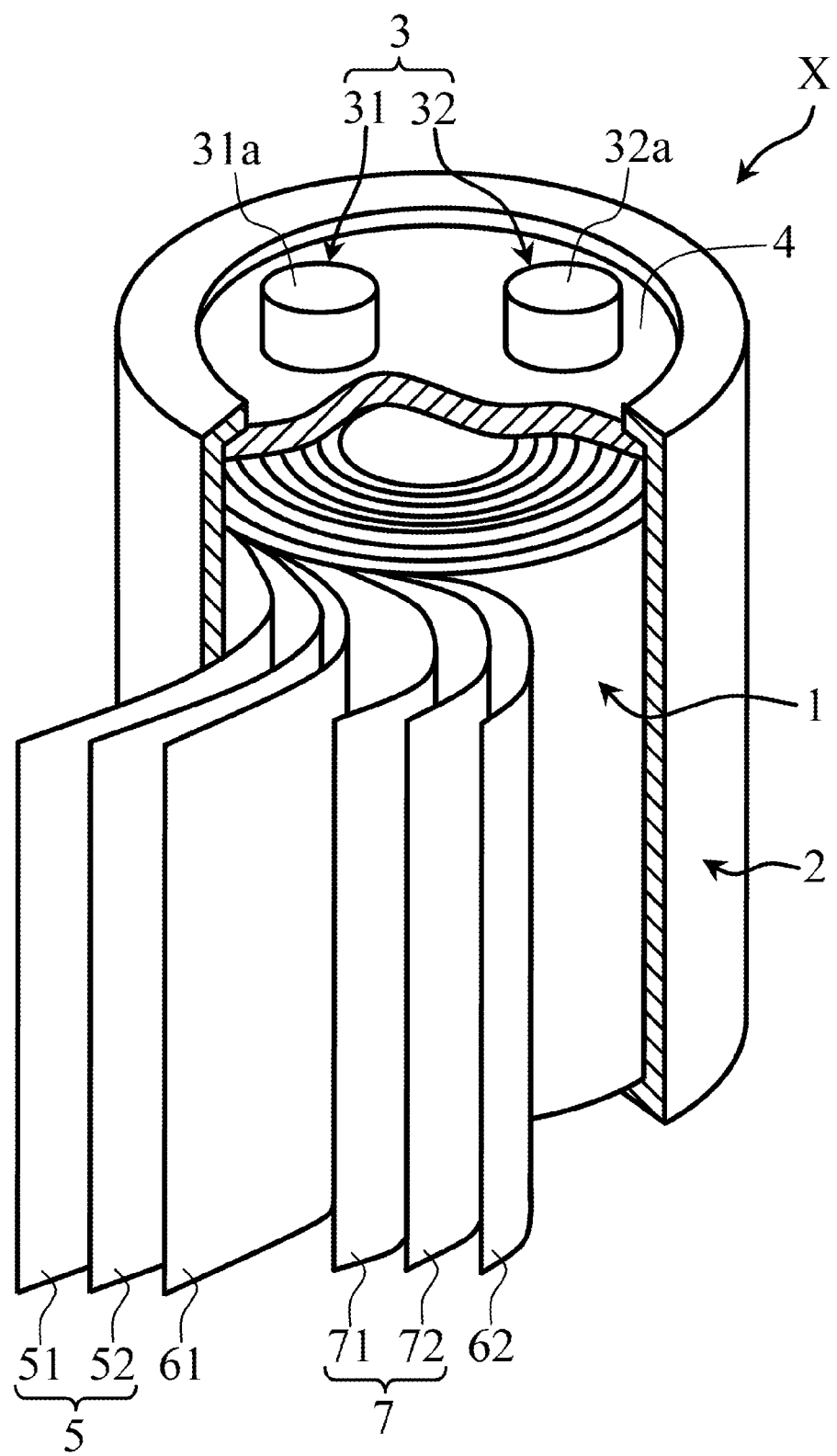
FIG. 1 is a perspective view illustrating an electric double-layer capacitor according to the present invention in a partially broken manner.
Figure 2:
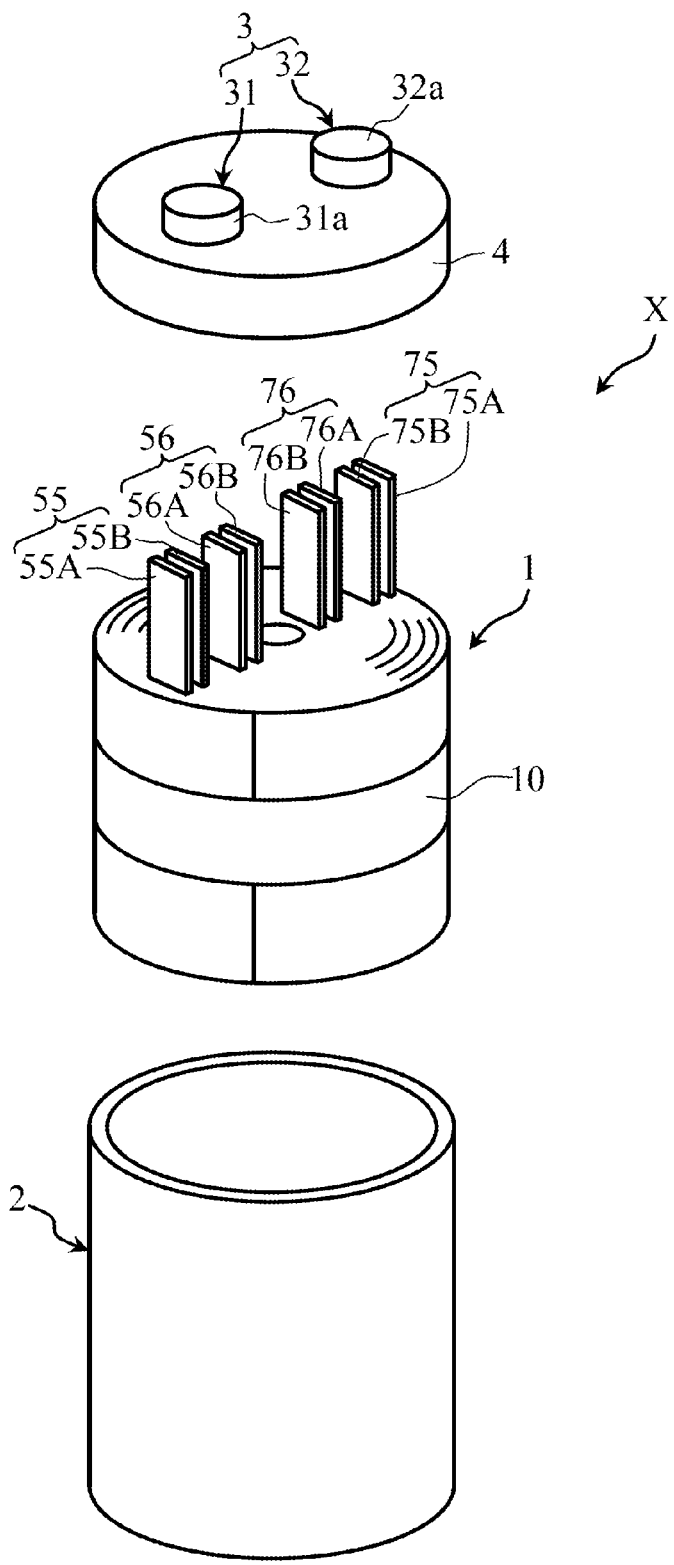
FIG. 2 is an exploded perspective view of the electric double-layer capacitor shown in FIG. 1.
Figure 3:
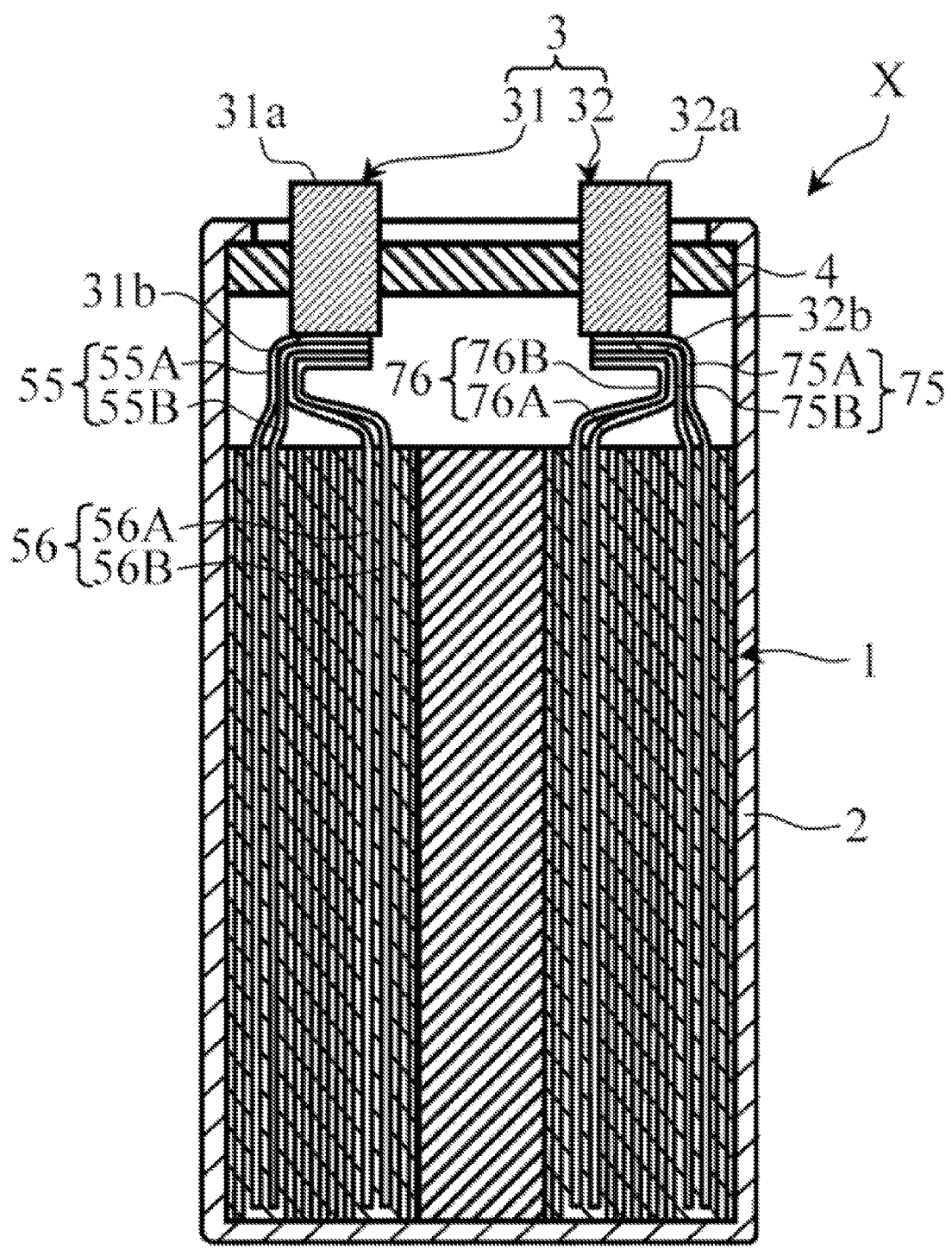
FIG. 3 is a cross-sectional view of the electric double-layer capacitor shown in FIG. 1.

An electric double-layer capacitor X shown in FIG. 1 to FIG. 3 has a double-winding and multi-tab structure and includes: a capacitor element 1, a case 2 for housing the capacitor element 1, an external terminal 3, and an insulating member 4.

The capacitor element 1 has a configuration in which a positive electrode body 5, a separator 61, a negative electrode body 7, and a separator 62 are stacked in this order (refer to FIG. 4) and are wound in a cylindrically-shaped manner. This capacitor element 1 whose winding state is maintained by a tape 10 attached on an outer periphery is housed in the case 2 in a state where the capacitor element 1 is impregnated with an electrolytic solution.

Figure 4:
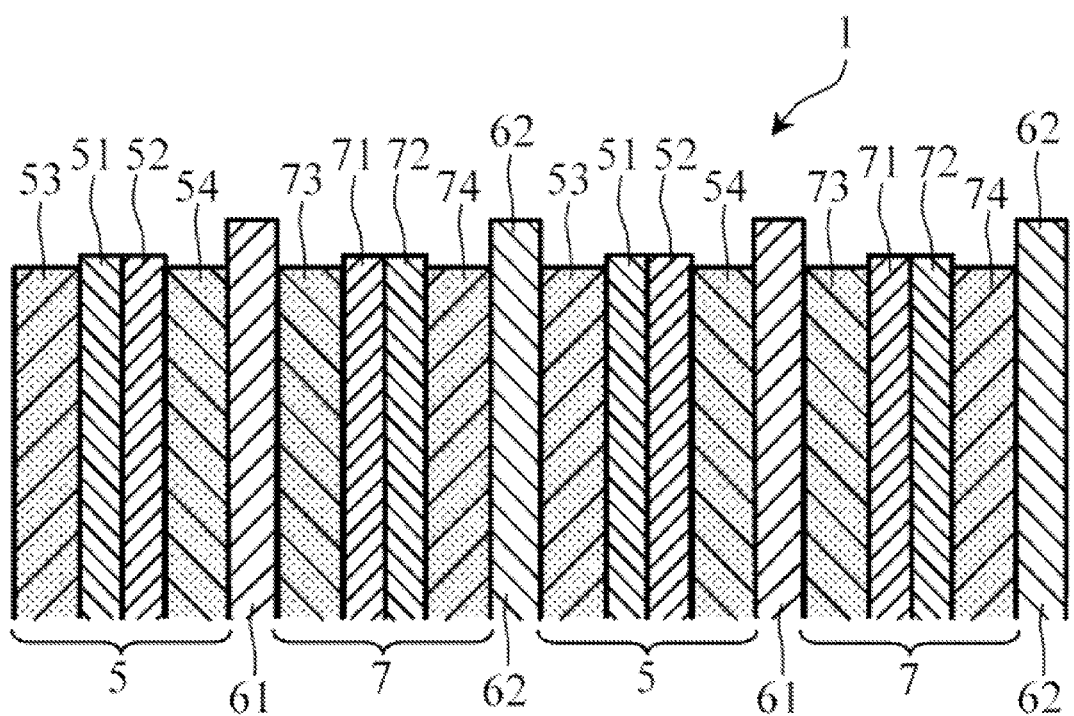
FIG. 4 is a cross-sectional view illustrating a principal part of a capacitor element in the electric double-layer capacitor shown in FIG. 1 in an enlarged manner.

As shown in FIG. 1, FIG. 4, and FIG. 5(a), the positive electrode body 5 includes: first and second positive electrode current collectors 51 and 52; polarized electrode layers 53 and 54; and a plurality of positive electrode current collector tab pairs 55 and 56.

The first and second positive electrode current collectors 51 and 52 are in contact with each other on surfaces of the first and second positive electrode current collectors 51 and 52, where the polarized electrode layers 53 and 54 are not formed, such that large parts thereof where portions with the positive electrode current collector tab pairs 55 and 56 interposed are excluded are in contact with each other, and the first and second positive electrode current collectors 51 and 52 are double-wound. Each of the positive electrode current collectors 51 and 52 is formed of metal foil such as aluminum foil and has a thickness of approximately 20 to 50 µm.

Each of the polarized electrode layers 53 and 54 is composed of a composition having an activated carbon powder and formed on one surface of each of the first and second positive electrode current collectors 51 and 52. Each of these polarized electrode layers 53 and 54 is formed, for example, by applying activated carbon slurry to the one surface of each of the first and second positive electrode current collectors 51 and 52 so as to have a given thickness and thereafter, drying the resultant. As the activated carbon slurry, for example, slurry which includes an activated carbon powder, carbon black, and a fluorine-based resin binder is used.

Figure 5:
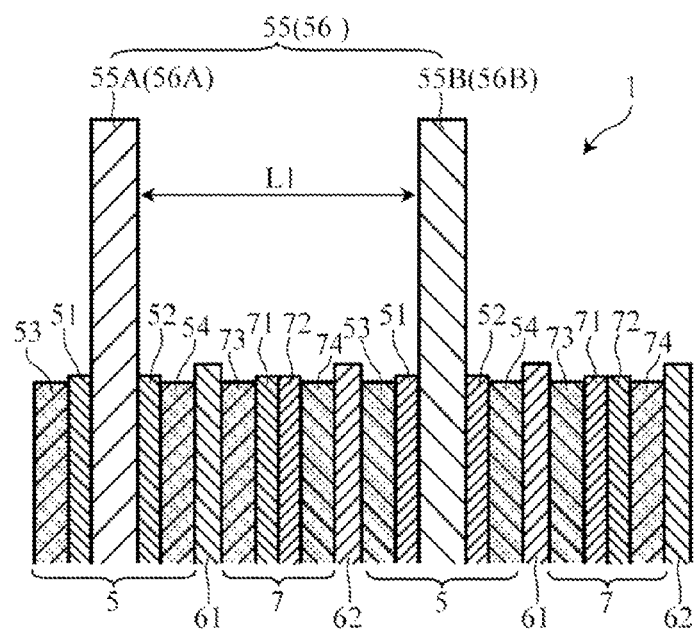
FIG. 5(a) and FIG. 5(b) are cross-sectional views illustrating other principal parts of the capacitor element shown in FIG. 4 in an enlarged manner.
Figure 5:
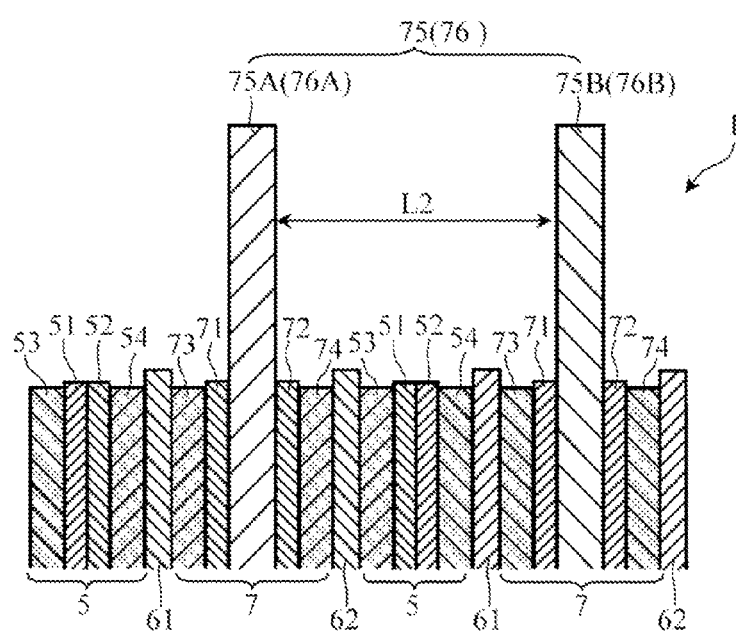

As shown in FIG. 1, FIG. 3, and FIG. 5(*a*), the respective positive electrode current collector tab pairs 55 and 56 include first positive electrode current collector tabs 55A and 56A and second positive electrode current collector tabs 55B and 56B, respectively.

Each of the first positive electrode current collector tabs 55A and 56A is fixed and wound on the other surface of the first positive electrode current collector 51 (one surface on which the polarized electrode layer 53 is not formed), thereby being pressed against and brought into contact with the other surface of the second positive electrode current collector 52 (one surface on which the polarized electrode layer 54 is not formed), with one end portion side thereof protruding from each of the first and second positive electrode current collectors 51 and 52. The end portion protruding from the current collectors 51 and 52 in each of the first positive electrode current collector tabs 55A and 56A is bent and connected to a positive electrode terminal 31 in the external terminal 3 (refer to FIG. 3). In contrast to this, each of the second positive electrode current collector tabs 55B and 56B is fixed and wound on the other surface of the second positive electrode current collector 52 (one surface on which the polarized electrode layer 54 is not formed), thereby being pressed against and brought into contact with the other surface of the first positive electrode current collector 51 (one surface on which the polarized electrode layer 53 is not formed), with one end portion side protruding from the first and second positive electrode current collectors 51 and 52. The end portion protruding from the current collectors 51 and 52 in each of the second positive electrode current collector tabs 55B and 56B is bent and connected to the positive electrode terminal 31 in the external terminal 3 (refer to FIG. 3). In other words, the first positive electrode current collector tabs 55A and 56A and the second positive electrode current collector tabs 55B and 56B are brought into conduction with both of the first positive electrode current collector 51 and the second positive electrode current collector 52 and are connected to the external terminal 3 (positive electrode terminal 31). These positive electrode current collector tabs 55A, 55B, 56A, and 56B are formed of, for example, metal such as aluminum so as to each have a thickness of approximately 100 to 200 µm and are fixed on the other surfaces of the first or second positive electrode current collector 51 and 52, respectively (surfaces, on each of which each of the polarized electrode layers 53 and 54 is not formed) by employing a method such as cold swaging, pinhole swaging, ultrasonic welding, laser welding, or resistance welding.

Figure 6:
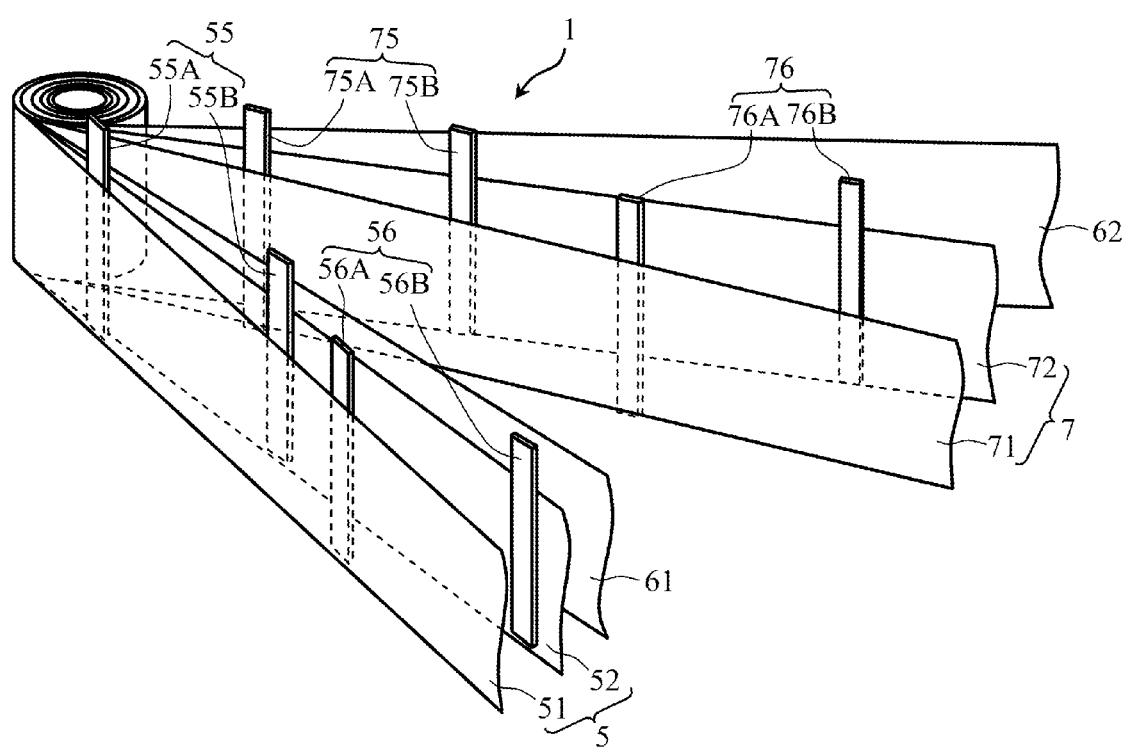
FIG. 6 is a perspective view in a state where in the capacitor element in the electric double-layer capacitor shown in FIG. 1, parts of a positive electrode body, a negative electrode body, and separators are pulled out.
Figure 7:
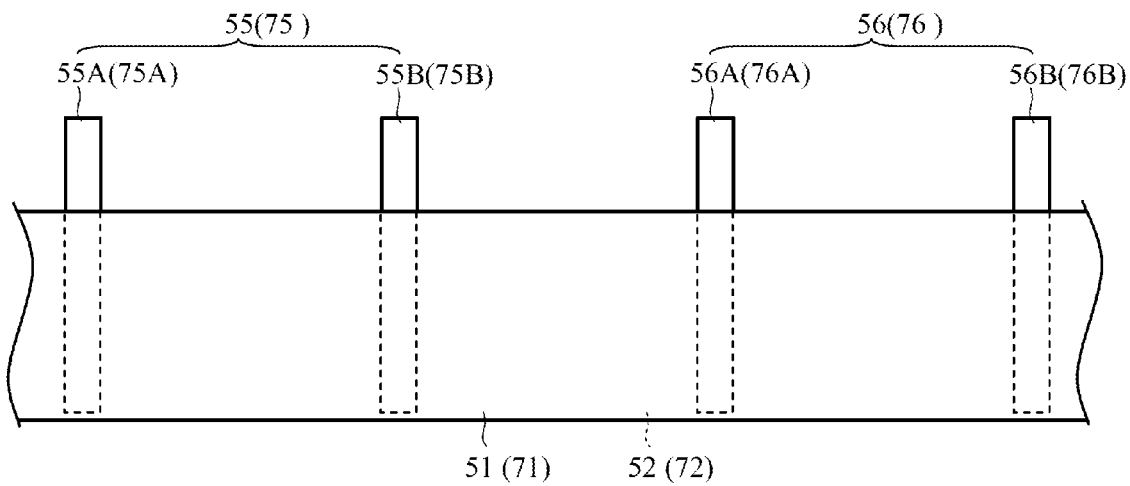
FIG. 7 is a front view illustrating a principal part of the positive electrode body (negative electrode body) of the capacitor element in the electric double-layer capacitor shown in FIG. 1.
Figure 8:
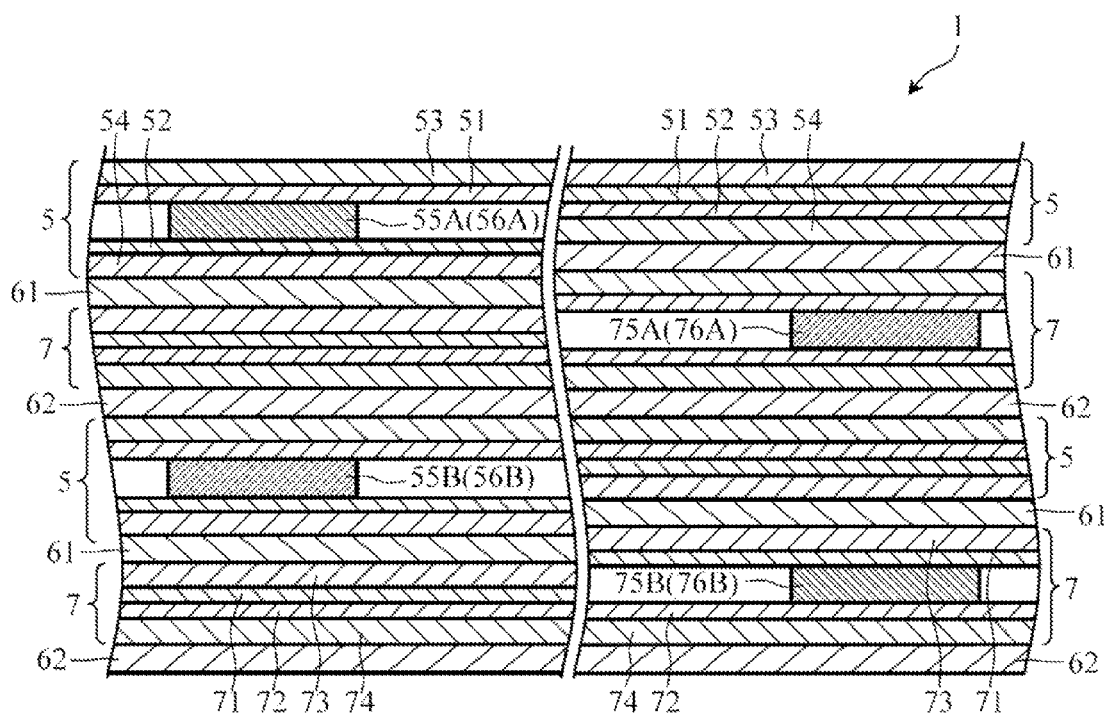
FIG. 8 is a cross-sectional view illustrating a principal part of the positive electrode body (negative electrode body) of the capacitor element in the electric double-layer capacitor shown in FIG. 1.

As shown in FIG. 6 and FIG. 7, in the respective positive electrode current collector tab pairs 55 and 56, the first positive electrode current collector tabs 55A and 56A and the second positive electrode current collector tabs 55B and 56B are displaced from each other, respectively in a state where the positive electrode body 5 is not wound. Preferably, between the first positive electrode current collector tab 55A of the positive electrode current collector tab pair 55 and the first positive electrode current collector tab 56A of the positive electrode current collector tab pair 56, the second positive electrode current collector tab 55B of the positive electrode current collector tab pair 55 or the second positive electrode current collector tab 56B of the positive electrode current collector tab pair 56 is located. On the other hand, as shown in FIG. 2, FIG. 5(*a*), and FIG. 8, in a state of the capacitor element 1 in which the positive electrode body 5 is wound together with the negative electrode body 7, the separators 61 and 62, and the like, the first positive electrode current collector tab 55A (56A) and the second positive electrode current collector tab 55B (56B) in the positive electrode current collector tab pair 55 (56) are spaced apart from each other with at least the second positive electrode current collector 52, the separator 61, the negative electrode body 7, and the first positive electrode current collector 51 interposed therebetween and are in a positional relationship in which the first positive electrode current collector tab 55A (56A) and the second positive electrode current collector tab 55B (56B) face each other. The positional relationship of the current collector tabs 55A (56A) and 55B (56B) is appropriately set in the state where the positive electrode body 5 is not wound, thereby allowing the first positive electrode current collector tabs 55A and 56A and the second positive electrode current collector tabs 55B and 56B to be spaced apart from each other and face each other, respectively. Similarly, a distance between the first positive electrode current collector tab 55A (56A) and the second positive electrode current collector tab 55B (56B) is adjusted in the state where the positive electrode body 5 is not wound, thereby allowing the distance L1, at which the first positive electrode current collector tab 55A (56A) and the second positive electrode current collector tab 55B (56B) are spaced apart from each other, to be adjusted.

As shown in FIG. 1, FIG. 4, and FIG. 5(*b*), the negative electrode body 7 has a configuration similar to that of the positive electrode body 5 and includes first and second negative electrode current collectors 71 and 72, polarized electrode layers 73 and 74, and a plurality of negative electrode current collector tab pairs 75 and 76.

The first and second negative electrode current collectors 71 and 72 are in contact with each other on surfaces of the first and second negative electrode current collectors 71 and 72, where polarized electrode layers 73 and 74 are not formed, such that large parts thereof where portions with the negative electrode current collector tab pairs 75 and 76 interposed are excluded are in contact with each other, and the first and second negative electrode current collectors 71 and 72 are double-wound. Each of the negative electrode current collectors 71 and 72 is formed of metal foil such as aluminum foil, as with the positive electrode current collectors 51 and 52. In addition, each of the polarized electrode layers 73 and 74 has a configuration similar to that of each of the polarized electrode layers 53 and 54 in the positive electrode body 5 and is formed by employing a method similar to the method employed to form the polarized electrode layers 53 and 54.

As shown in FIG. 1, FIG. 3, and FIG. 5(*b*), the respective negative electrode current collector tab pairs 75 and 76 includes first negative electrode current collector tabs 75A and 76A and second negative electrode current collector tabs 75B and 76B, respectively. Each of the first negative electrode current collector tabs 75A and 76A is fixed and wound on the other surface of the first negative electrode current collector 71 (one surface on which a polarized electrode layer 73 is not formed), thereby being pressed against and brought into contact with the other surface of the second negative electrode current collector 72 (one surface on which a polarized electrode layer 74 is not formed) with one end portion side thereof protruding from the first and second negative electrode current collectors 71 and 72. The end portion protruding from the current collectors 71 and 72 in each of the first negative electrode current collector tabs 75A and 76A is bent so as to be crank-shaped and connected to a negative electrode terminal 32 in the external terminal 3. In contrast to this, each of the second negative electrode current collector tabs 75B and 76B is fixed and wound on the other surface of the second negative electrode current collector 72 (one surface on which the polarized electrode layer 74 is not formed), thereby being pressed against and brought into contact with the other surface of the first negative electrode current collector 71 (one surface on which the polarized electrode layer 73 is not formed), with one end portion side protruding from the first and second negative electrode current collectors 71 and 72. The end portion protruding from the current collectors 71 and 72 in each of the second negative electrode current collector tabs 75B and 76B is bent so as to be crank-shaped and connected to the negative electrode terminal 32 in the external terminal 3. In other words, the first negative electrode current collector tabs 75A and 76A and the second negative electrode current collector tabs 75B and 76B are brought into conduction with both of the first negative electrode current collector 71 and second negative electrode current collector 72 and are connected to the external terminal 3 (negative electrode terminal 32). These negative electrode current collector tabs 75A, 75B, 76A, and 76B are formed of, for example, metal such as aluminum so as to each have a thickness of approximately 100 to 200 μm and are fixed on the other surfaces on the first or second negative electrode current collectors 71 or 72 (surface, on each of which each of the polarized electrode layers 73 and 74 is not formed) by employing the method such as cold swaging, pinhole swaging, ultrasonic welding, laser welding, or resistance welding.

As shown in FIG. 6 and FIG. 7, in the respective negative electrode current collector tab pairs 75 and 76, the first negative electrode current collector tabs 75A and 76A and the second negative electrode current collector tabs 75B and 76B are displaced from each other, respectively in a state where the negative electrode body 7 is not wound. Preferably, between the first negative electrode current collector tab 75A of the negative electrode current collector tab pair 75 and the first negative electrode current collector tab 76A of the negative electrode current collector tab pair 76, the second negative electrode current collector tab 75B of the negative electrode current collector tab pair 75 or the second negative electrode current collector tab 76B of the negative electrode current collector tab pair 76 is located. On the other hand, as shown in FIG. 2, FIG. 5(*b*), and FIG. 8, in a state of the capacitor element 1 in which the positive electrode body 5 is wound together with the negative electrode body 7, the separators 61 and 62, and the like, the first negative electrode current collector tab 75A (76A) and the second negative electrode current collector tab 75B (76B) in the negative electrode current collector tab pair 75 (76) are spaced apart from each other with at least the second negative electrode current collector 72, the separator 62, the positive electrode body 5, and the first negative electrode current collector 71 interposed therebetween and are in a positional relationship in which the first negative electrode current collector tab 75A (76A) and the second negative electrode current collector tab 75B (76B) face each other. The positional relationship of the current collector tabs 75A (76A) and 75B (76B) is appropriately set in the state where the negative electrode body 7 is not wound, thereby allowing the first negative electrode current collector tabs 75A and 76A and the second negative electrode current collector tabs 75B and 76B to be spaced apart from each other and face each other. Similarly, a distance between the first negative electrode current collector tab 75A (76A) and the second negative electrode current collector tab 75B (76B) in the state where the negative electrode body 7 is not wound is adjusted, thereby allowing the distance L2, at which the first negative electrode current collector tab 75A (76A) and the second negative electrode current collector tab 75B (76B) are spaced apart from each other, to be adjusted.

As shown in FIG. 1 and FIG. 4, the separators 61 and 62 are to prevent the positive electrode body 5 and the negative electrode body 7 from short-circuiting and are each obtained by impregnating a porous solid with an electrolytic solution. As the porous solid, for example, cellulose fiber paper is used. As the electrolytic solution, for example, a propylene carbonate solution in which 1 mol/L tetraethylammonium tetrafluoroborate is dissolved is used.

The case 2 shown in FIG. 1 to FIG. 3 is produced by using light metal such as aluminum as a material and is of a cylindrical shape having a bottom.

The external terminal 3 includes the positive electrode terminal 31 and the negative electrode terminal 32. These terminals 31 and 32 are fixed in the insulating member 4 such that end parts 31*a*, 31*b*, 32*a*, and 32*b* are exposed. The positive electrode terminal 31 and the negative electrode terminal 32 are terminals, for example, which are screw-shaped, and in this case, the positive electrode terminal 31 and the negative electrode terminal 32 are fixed so as to be screwed in the insulating member 4. The end part 31*b* of the positive electrode terminal 31 is connected to or caused to contact the positive electrode current collector tabs 55A, 55B, 56A, and 56B of the capacitor element 1, and the end part 32*b* of the negative electrode terminal 42 is connected to or caused to contact the negative electrode current collector tabs 75A, 75B, 76A, and 76B of the capacitor element 1. In the drawings, the end parts 31*b* and 32*b* are directly connected to or caused to contact the positive electrode current collector tabs 55A, 55B, 56A, and 56B or the negative electrode current collector tabs 75A, 75B, 76A, and 76B. However, the end parts 31*b* and 32*b* may be indirectly connected to or caused to contact, via a conductor plate or the like, the positive electrode current collector tabs 55A, 55B, 56A, and 56B or the negative electrode current collector tabs 75A, 75B, 76A, and 76B. In addition, the positive electrode terminal 31 and the negative electrode terminal 32 are not limited to the screw-shaped terminals and may be terminals each having other shape.

The insulating member 4 is to maintain a state where the external terminal 3 is brought into conduction with the positive electrode current collector tabs 55A, 55B, 56A, and 56B and the negative electrode current collector tabs 75A, 75B, 76A, and 76B while maintaining insulation between the external terminal 3 and the case 2. This insulating member 4 is formed of a synthetic resin or the like having insulation properties.

In the electric double-layer capacitor X, as shown in FIG. 6 and FIG. 7, in the state where the positive electrode body 5 and the negative electrode body 7 are not wound, the first positive electrode current collector tabs 55A and 56A and the second positive electrode current collector tabs 55B and 56B are displaced from each other, respectively, and the first negative electrode current collector tabs 75A and 76A and the second negative electrode current collector tabs 75B and 76B are displaced from each other, respectively. Therefore, in the state where the positive electrode body 5 and the negative electrode body 7 are wound, current collecting points between the positive electrode current collectors 55 and 56 and the positive electrode current collector tabs 55A, 55B, 56A, and 56B can be dispersed, and current collecting points between the negative electrode current collectors 75 and 76 and the negative electrode current collector tabs 75A, 75B, 76A, and 76B can be dispersed. Accordingly, in the electric double-layer capacitor X, by dispersing the current collecting points, an internal resistance by the current collectors 55, 56, 75, and 76 upon charging and discharging can be reduced.

Furthermore, in the electric double-layer capacitor X, since all the current collector tabs 55, 56, 75, and 76 are located so as to be appropriately spaced, distances among the neighboring current collector tabs 55, 56, 75, and 76 in the current collectors 51, 52, 71, and 72 in a circumferential direction can be made appropriate. Therefore, it is made possible to make the internal resistance by the current collectors 51, 52, 71, and 72 among the neighboring current collector tabs 55, 56, 75, and 76 appropriately small. In addition, in the electric double-layer capacitor X, whereas the positive electrode current collector tabs 55A, 55B, 56A, and 56A are brought into conduction with both of the first and second positive electrode current collectors 51 and 52, the negative electrode current collector tabs 75A, 75B, 76A, and 76A are brought into conduction with both of the first and second negative electrode current collectors 71 and 72. Therefore, the electric double-layer capacitor X is capable of ensuring current conducting paths between the two current collectors 51 and 52 as well as between the two current collectors 71 and 72 among the respective current collector tabs 55, 56, 75, and 76, and also in this regard, the internal resistance can be reduced.

Figure 9:
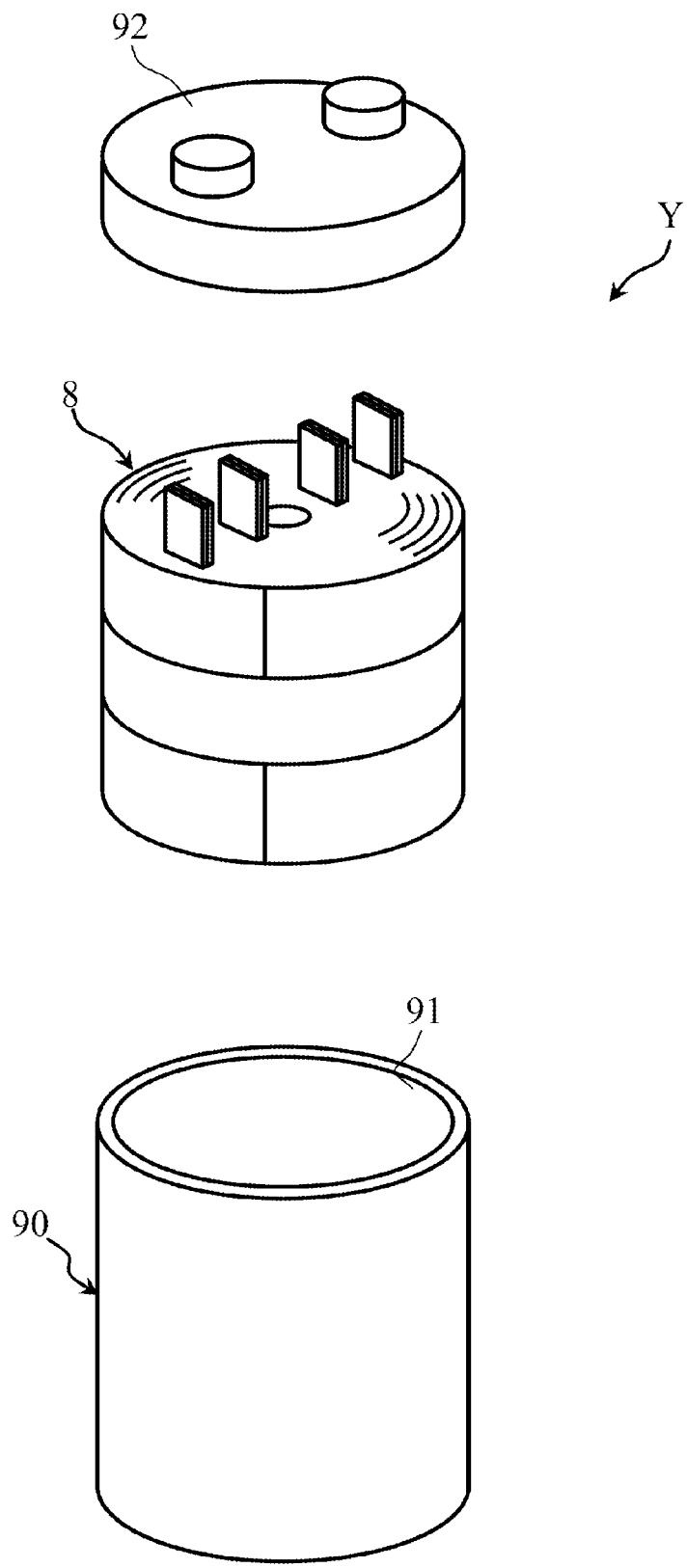
FIG. 9 is an exploded perspective view illustrating one example of the conventional electric double-layer capacitor.
Figure 10:
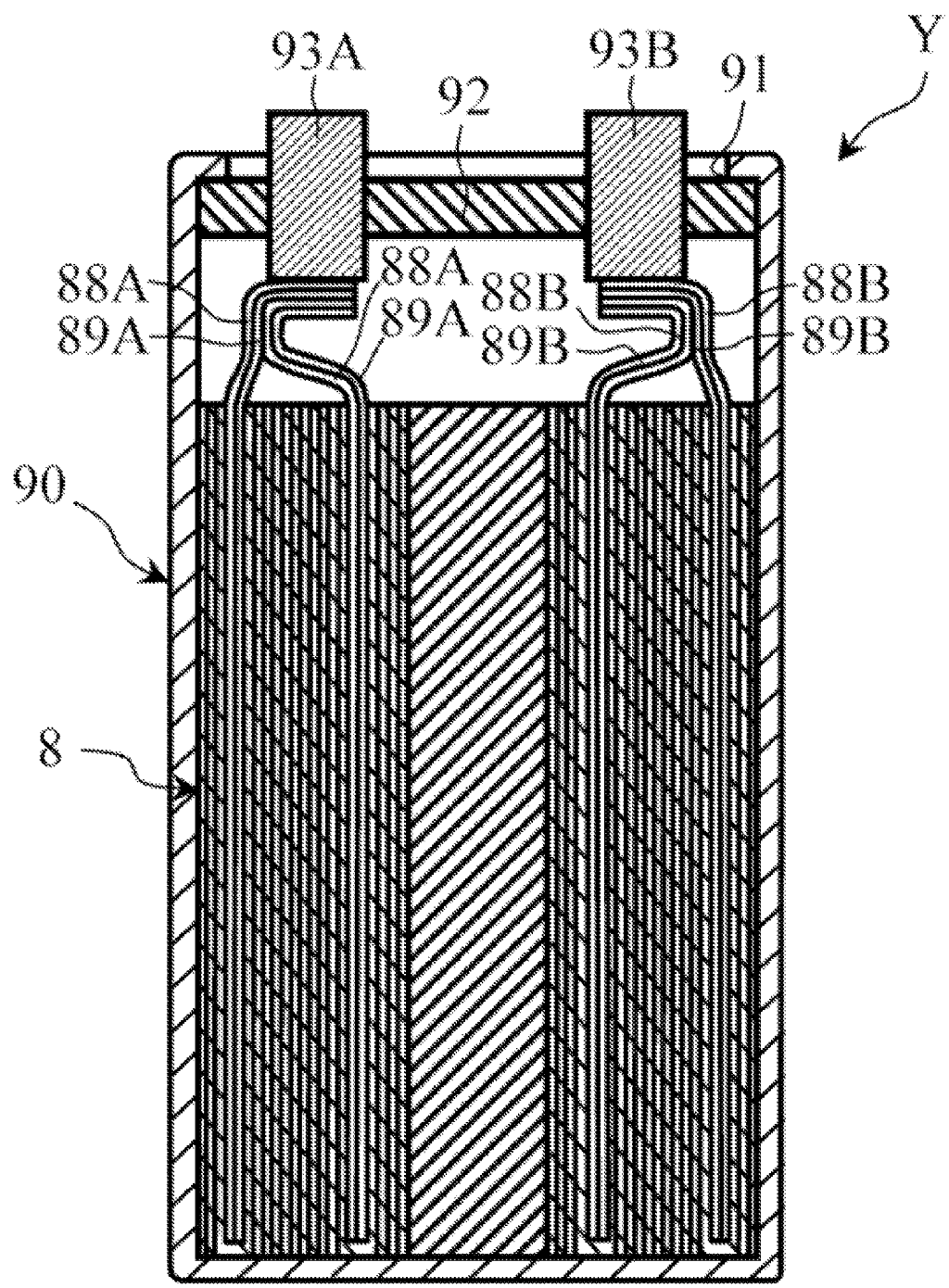
FIG. 10 is a cross-sectional view of the electric double-layer capacitor shown in FIG. 9.
Figure 11:
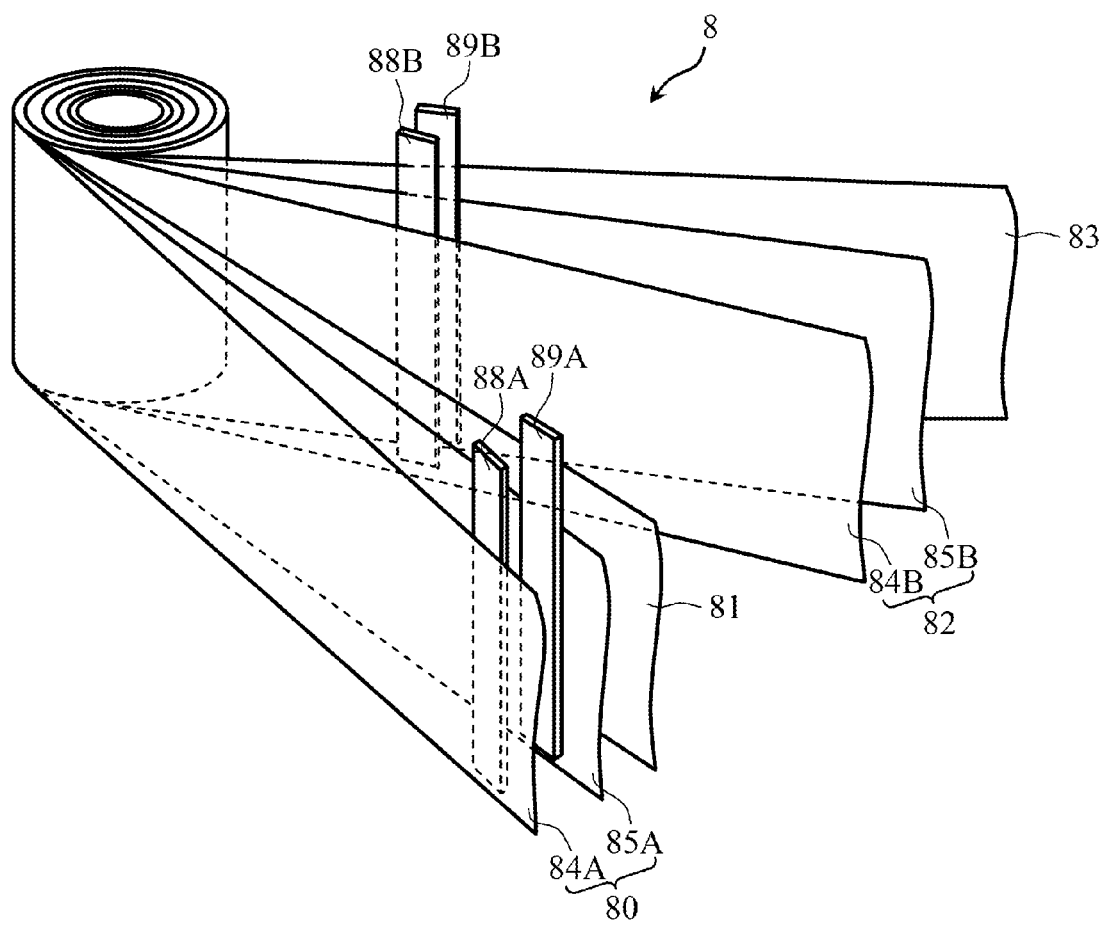
FIG. 11 is a perspective view in a state where in the capacitor element in the electric double-layer capacitor shown in FIG. 9, parts of a positive electrode body, a negative electrode body, and separators are pulled out.
Figure 12:
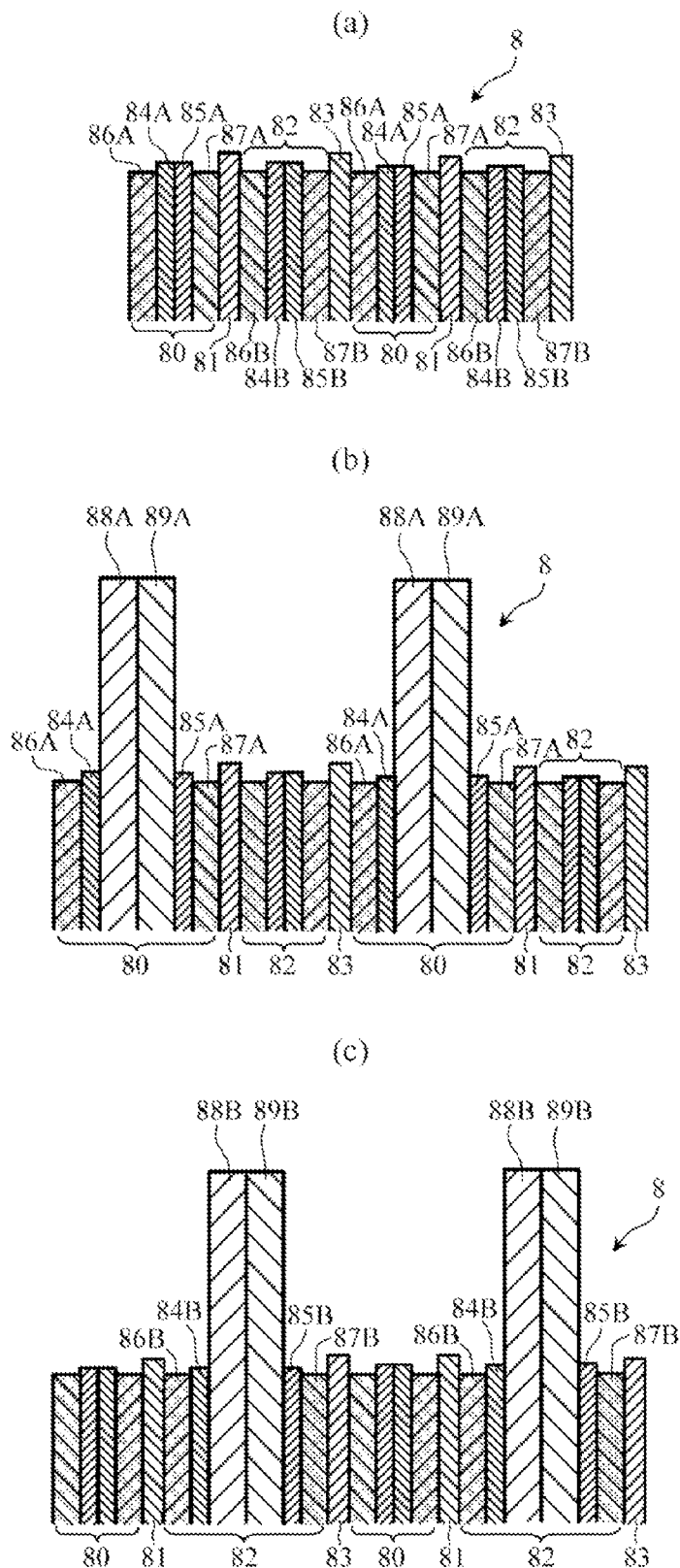
FIG. 12(a), FIG. 12(b), and FIG. 12(c) are cross-sectional views illustrating principal parts of the capacitor element in the electric double-layer capacitor shown in FIG. 9.
Figure 13:
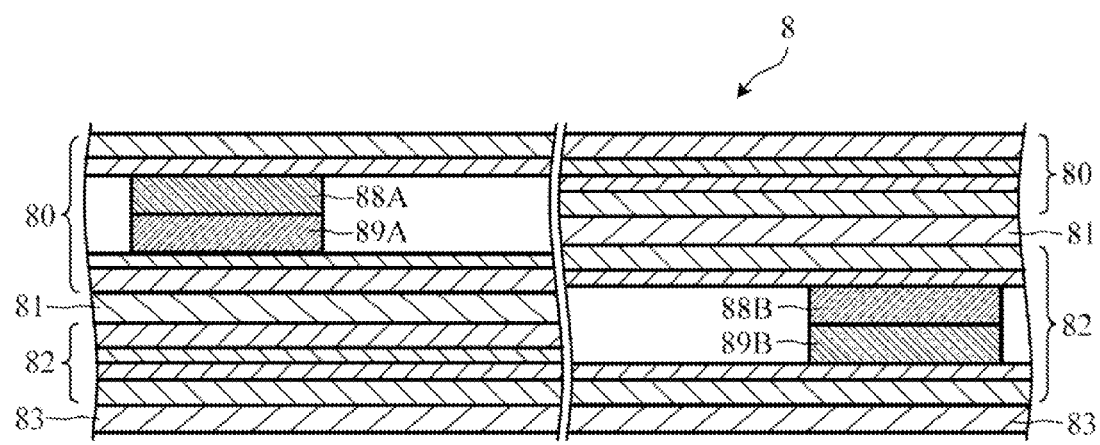
FIG. 13 is a cross-sectional view illustrating a principal part of the capacitor element in the electric double-layer capacitor shown in FIG. 9.

In addition, as shown in FIG. 2, FIG. 5(a), FIG. 5(b), and FIG. 8, in the electric double-layer capacitor X, the first positive electrode current collector tabs 55A and 56A and the second positive electrode current collector tabs 55B and 56B are not in contact with each other and are spaced apart from each other, respectively and the first negative electrode current collector tabs 75A and 76A and the second negative electrode current collector tabs 75B and 76B are not in contact with each other and are spaced apart from each other, respectively. Therefore, the current collector tabs 55, the current collector tabs 56, the current collector tabs 75 and the current collector tabs 76 do not lie on top of each other, respectively in a state where the portions fixed on the positive electrode body 5 or the negative electrode body 7 contact each other. Accordingly, as compared with the conventional electric double-layer capacitor Y (refer to FIG. 9 and FIG. 13) in which the paired positive electrode current collector tabs or negative electrode current collector tabs lie on top of each other in the same one portion, a stress exerted on the current collectors 51, 52, 71, and 72 and the like, resulting from the current collector tabs 55, 56, 75, and 76 can be made a stress resulting from a thickness of one tab. Therefore, a stress exerted on the positive electrode body 5, the positive electrode body 7, and the separators 61 and 62 can be alleviated.

The present invention is not limited to the above-described embodiment and can be modified in a various manner. For example, in the above-described example, each of the numbers of the positive electrode current collector tab pairs and the negative electrode current collector tab pairs is two. However, each of the numbers of the positive electrode current collector tab pairs and the negative electrode current collector tab pairs may be three or more or be one, and it is only required to appropriately set each of the numbers of the positive electrode current collector tab pairs and the negative electrode current collector tab pairs in accordance with a size or the like of a capacitor element.

In addition, in the above-described example, each of the polarized electrode layers is formed by applying the activated carbon slurry to the one surface of each of the first and second positive electrode current collectors so as to have the given thickness and thereafter, drying the resultant. However, in addition thereto, as the electrode, a sheet electrode which is obtained by kneading activated carbon, carbon black, and a binder, forming the kneaded resultant so as to be sheet-like, and attaching the sheet-like polarized electrode layer onto a current collector or an electrode which is obtained by attaching, to a current collector, activated carbon fiber formed so as to be cloth-like may be used.

REFERENCE SIGNS LIST

X electric double-layer capacitor
1 capacitor element
2 case
3 external terminal
4 insulating member
10 tape
31 positive electrode terminal
32 negative electrode terminal
5 positive electrode body
51 first positive electrode current collector
52 second positive electrode current collector
55, 56 positive electrode current collector tab pair
55A, 56A first positive electrode current collector tab
55B, 56B second positive electrode current collector tab
61, 62 separator
7 negative electrode body
71 first negative electrode current collector
72 second negative electrode current collector
75, 76 negative electrode current collector tab pair
75A, 76A first negative electrode current collector tab
75B, 76B second negative electrode current collector tab

The invention claimed is:

1. An electric double-layer capacitor comprising: a capacitor element impregnated with an electrolytic solution; a case for housing the capacitor element; and an external positive electrode terminal and an external negative electrode terminal, the external positive electrode terminal and the external negative electrode terminal being brought into conduction with the capacitor element, the capacitor element obtained by stacking and winding a positive electrode body, a separator, and a negative electrode body, the positive electrode body including a first positive electrode current collector wound in a cylindrically-shaped manner, a second positive electrode current collector wound in a cylindrically-shaped manner, and a plurality of positive electrode current collector tab pairs being brought into conduction with the external positive electrode terminal, the first positive electrode current collector having one surface where a polarized electrode layer is not formed and another surface where the polarized electrode layer is formed, the second positive electrode current collector having one surface where a polarized electrode layer is not formed and another surface where the polarized electrode layer is formed, the one surface of the first positive electrode current collector and the one surface of the second positive electrode current collector being in contact with each other, each of the positive electrode current collector tab pairs having a first positive electrode current collector tab being fixed onto the one surface of the first positive electrode current collector where the polarized electrode layer is not formed, and a second positive electrode current collector tab being fixed onto the one surface of the second positive electrode current collector where the polarized electrode layer is not formed, and being displaced from the first positive electrode current collector tab in a state where the positive electrode body is not wound, the negative electrode body including a first negative electrode current collector wound in a cylindrically-shaped manner, a second negative electrode current collector wound in a cylindrically-shaped manner, and a plurality of negative electrode current collector tab pairs being brought into conduction with the external negative electrode terminal, the first negative electrode current collector having one surface where a polarized electrode layer is not formed and another surface where the polarized electrode layer is formed, the second negative electrode current collector having one surface where a polarized electrode layer is not formed and another surface where the polarized electrode layer is formed, the one surface of the first negative electrode current collector and the one surface of the second negative electrode current collector being in contact with each other, each of the negative electrode current collector tab pairs having a first negative electrode current collector tab being fixed onto the one surface of the first negative electrode current collector where the polarized electrode layer is not formed, and a second negative electrode current collector tab being fixed onto the one surface of the second negative electrode current collector where the polarized electrode layer is not formed, and being displaced from the first negative electrode current collector tab in a state where the negative electrode body is not wound.

2. An electric double-layer capacitor comprising: a capacitor element impregnated with an electrolytic solution; a case for housing the capacitor element; and an external positive electrode terminal and an external negative electrode terminal, the external positive electrode terminal and the external negative electrode terminal being brought into conduction with the capacitor element, the capacitor element obtained by stacking and winding a positive electrode body, a separator, and a negative electrode body, the positive electrode body including a first positive electrode current collector, a second positive electrode current collector having one surface side being in contact with one surface of the first positive electrode current collector, and a plurality of positive electrode current collector tab pairs being brought into conduction with the external positive electrode terminal, each of the positive electrode current collector tab pairs having a first positive electrode current collector tab being fixed onto the one surface of the first positive electrode current collector and a second positive electrode current collector tab being fixed onto the one surface of the second positive electrode current collector, the first positive electrode current collector tab and the second positive electrode current collector tab being spaced apart from each other with the second positive electrode current collector, the separator, the first negative electrode current collector, the second negative electrode current collector, and the first positive electrode current collector being interposed, the negative electrode body including a first negative electrode current collector, a second negative electrode current collector having one surface side being in contact with one surface of the first negative electrode current collector, and a plurality of negative electrode current collector tab pairs being brought into conduction with the external negative electrode terminal, each of the negative electrode current collector tab pairs having a first negative electrode current collector tab being fixed onto the one surface of the first negative electrode current collector and a second negative electrode current collector tab being fixed onto the one surface of the second negative electrode current collector, the first negative electrode current collector tab and the second negative electrode current collector tab being spaced apart from each other with the second negative electrode current collector, the separator, the first positive electrode current collector, the second positive electrode current collector, and the first negative electrode current collector being interposed.

3. The electric double-layer capacitor according to claim 1, wherein the plurality of positive electrode current collector tab pairs include a first positive electrode current collector tab pair and a second positive electrode current collector tab pair, and in a state where the positive electrode body is not wound, between a first positive electrode current collector tab of the first positive electrode current collector tab pair and a first positive electrode current collector tab of the second positive electrode current collector tab pair, a second positive electrode current collector tab of the first positive electrode current collector tab pair or the second positive electrode current collector tab pair is located, and the plurality of negative electrode current collector tab pairs include a first negative electrode current collector tab pair and a second negative electrode current collector tab pair, and in a state where the negative electrode body is not wound, between a first negative electrode current collector tab of the first negative electrode current collector tab pair and a first negative electrode current collector tab of the second negative electrode current collector tab pair, a second negative electrode current collector tab of the first negative electrode current collector tab pair or the second negative electrode current collector tab pair is located.

4. The electric double-layer capacitor according to claim 1, wherein
the first positive electrode current collector tab is fixed on the first positive electrode current collector while being in contact with the second positive electrode current collector,
the second positive electrode current collector tab is fixed on the second positive electrode current collector while being in contact with the first positive electrode current collector,
the first negative electrode current collector tab is fixed on the first negative electrode current collector while being in contact with the second negative electrode current collector, and
the second negative electrode current collector tab is fixed on the second negative electrode current collector while being in contact with the first negative electrode current collector.

5. The electric double-layer capacitor according to claim 2, wherein
the plurality of positive electrode current collector tab pairs include a first positive electrode current collector tab pair and a second positive electrode current collector tab pair, and in a state where the positive electrode body is not wound, between a first positive electrode current collector tab of the first positive electrode current collector tab pair and a first positive electrode current collector tab of the second positive electrode current collector tab pair, a second positive electrode current collector tab of the first positive electrode current collector tab pair or the second positive electrode current collector tab pair is located, and
the plurality of negative electrode current collector tab pairs include a first negative electrode current collector tab pair and a second negative electrode current collector tab pair, and in a state where the negative electrode body is not wound, between a first negative electrode current collector tab of the first negative electrode current collector tab pair and a first negative electrode current collector tab of the second negative electrode current collector tab pair, a second negative electrode current collector tab of the first negative electrode current collector tab pair or the second negative electrode current collector tab pair is located.

6. The electric double-layer capacitor according to claim 2, wherein
the first positive electrode current collector tab is fixed on the first positive electrode current collector while being in contact with the second positive electrode current collector,
the second positive electrode current collector tab is fixed on the second positive electrode current collector while being in contact with the first positive electrode current collector,
the first negative electrode current collector tab is fixed on the first negative electrode current collector while being in contact with the second negative electrode current collector, and
the second negative electrode current collector tab is fixed on the second negative electrode current collector while being in contact with the first negative electrode current collector.

7. The electric double-layer capacitor according to claim 3, wherein
the first positive electrode current collector tab is fixed on the first positive electrode current collector while being in contact with the second positive electrode current collector,
the second positive electrode current collector tab is fixed on the second positive electrode current collector while being in contact with the first positive electrode current collector,
the first negative electrode current collector tab is fixed on the first negative electrode current collector while being in contact with the second negative electrode current collector, and
the second negative electrode current collector tab is fixed on the second negative electrode current collector while being in contact with the first negative electrode current collector.

* * * * *